United States Patent
Zhai et al.

(10) Patent No.: US 12,456,318 B2
(45) Date of Patent: Oct. 28, 2025

(54) METHODS AND DEVICES FOR GENERATING TRAINING SAMPLE, TRAINING MODEL AND RECOGNIZING CHARACTER

(71) Applicant: CANAAN BRIGHT SIGHT CO., LTD, Beijing (CN)

(72) Inventors: Xingang Zhai, Beijing (CN); Nangeng Zhang, Beijing (CN)

(73) Assignee: Canaan Bright Sight Co., Ltd., Beijing (CN)

( * ) Notice: Subject to any disclaimer, the term of this patent is extended or adjusted under 35 U.S.C. 154(b) by 449 days.

(21) Appl. No.: 17/782,677

(22) PCT Filed: Nov. 3, 2020

(86) PCT No.: PCT/CN2020/126197
§ 371 (c)(1),
(2) Date: Jun. 6, 2022

(87) PCT Pub. No.: WO2021/109775
PCT Pub. Date: Jun. 10, 2021

(65) Prior Publication Data
US 2023/0007989 A1 Jan. 12, 2023

(30) Foreign Application Priority Data
Dec. 5, 2019 (CN) .......................... 201911233955.0

(51) Int. Cl.
*G06V 30/19* (2022.01)
*G06V 30/148* (2022.01)

(52) U.S. Cl.
CPC ...... *G06V 30/19147* (2022.01); *G06V 30/153* (2022.01)

(58) Field of Classification Search
CPC ....................... G06V 30/19147; G06V 30/153
See application file for complete search history.

(56) References Cited

U.S. PATENT DOCUMENTS

2017/0308768 A1* 10/2017 Fei ........................ G06V 30/196
2019/0325272 A1* 10/2019 Tatsumi .............. G06F 18/2163

FOREIGN PATENT DOCUMENTS

| CN | 106709530 A | * | 5/2017 | .......... G06F 18/2411 |
| CN | 108491844 A | | 9/2018 | |

(Continued)

*Primary Examiner* — Wednel Cadeau
(74) *Attorney, Agent, or Firm* — Blank Rome LLP

(57) ABSTRACT

Methods and devices for generating a training sample, training a model and recognizing a character are provided. The method for generating a training sample comprises: acquiring an image of characters, and determining respective characters contained in the image; and using a projection method to determine weights of the respective characters contained in the image, tagging the image with labels according to the weights of the respective characters contained in the image, and forming a training sample. The method for training a model comprises: using the training sample to train a character recognition model. The method for recognizing a character comprises: using the character recognition model to perform character recognition. The above methods and devices realize accurate recognition of characters, such as double-half characters, contained in an image of a wheel-type meter, and can provide a highly accurate biased recognition result.

17 Claims, 5 Drawing Sheets

(56) References Cited

FOREIGN PATENT DOCUMENTS

| CN | 110705488 A | * | 1/2020 | ............... G06T 7/12 |
| CN | 111079763 A | | 4/2020 | |

* cited by examiner

METHODS AND DEVICES FOR GENERATING TRAINING SAMPLE, TRAINING MODEL AND RECOGNIZING CHARACTER

CROSS-REFERENCE TO RELATED APPLICATIONS

This application is a National Stage of International patent application PCT/CN2020/126197, filed Nov. 3, 2020, which claims priority to foreign Chinese patent application No. CN 201911233955.0, filed Dec. 5, 2019, the disclosures of which are incorporated by reference in their entirety.

TECHNICAL FIELD

The present disclosure belongs to the field of image recognition technologies, and in particular relates to methods and devices for generating a training sample, for model training, and for character recognition.

BACKGROUND

This section is intended to provide background or context to embodiments of the present disclosure as set forth in claims. What is described herein is not admitted to be prior art by virtue of its inclusion in this section.

With increasing development and improvement of intelligent systems, remote meter reading technology has emerged to solve difficulties in manual meter reading and statistical works, and has become an important part of the modern management system. Meters with wireless meter reading functions, such as water meters, electricity meters and gas meters, have been gradually used in residential areas and high-end parks.

As a foundation and core of an automatic meter reading system for wheel-type meter, a character recognition function for the wheel-type meter directly determines the system performance. At present, a reading on the face of wheel-type meter is generally recognized by a character recognition model.

However, the above existing solutions have the following problems. For the wheel-type meter, character recognition includes single full-character recognition and dual partial-character recognition. However, training samples corresponding to the dual partial-character type are generally annotated merely with class labels for training the character recognition model. For example, the character image in FIG. 2b is generally annotated with a label "0", "1", or "0-1", without taking into account a character bias existing in the character image in FIG. 2b due to being of the dual partial-character type, e.g., the actual reading in FIG. 2b shows an obvious bias toward the character "0". As a result, the training samples may be caused to fail to match the real situation, such that the character recognition model trained based on the training samples have rather low recognition rates for the dual partial-character images.

SUMMARY

In view of the problems in the related art that the generated training samples are liable to fail to match the real situation and thus the character recognition model trained based on the training samples has a rather low recognition rate for the dual partial-character images, the present disclosure proposes methods and devices for generating a training sample, for model training, and for character recognition, and a computer-readable storage medium, that can solve the aforesaid problems.

The present disclosure provides the following solutions.

In a first aspect, provided is a method of generating a training sample, which includes: acquiring a character image and determining each character contained in the character image; and determining a weight value for said each character contained in the character image by utilizing a projection approach, and labeling the character image according to the weight value of said each character contained in the character image to form a training sample.

Preferably, acquiring the character image and determining each character contained in the character image includes: capturing a face image of a wheel-type meter; acquiring the character image corresponding to a preset character wheel of the wheel-type meter by performing character segmentation on the face image; and determining each character contained in the character image based on a rotational position of the preset character wheel.

Preferably, determining the weight value for said each character contained in the character image by utilizing the projection approach includes: determining, by utilizing the projection approach, a total character region of the character image and a partial character region corresponding to said each character in the total character region; and determining a projected ratio of the partial character region to the total character region, and determining the weight value for said each character contained in the character image based on the projected ratio.

Preferably, labeling the character image according to the weight value of said each character contained in the character image includes: updating a preset weight sequence according to the weight value of said each character contained in the character image to acquire a target weight sequence, and labeling the character image according to the target weight sequence; where the preset weight sequence is pre-constructed by arranging preset weight values of a plurality of candidate characters in a preset arrangement order, and each of the plurality of candidate characters has a preset weight value of 0.

In a second aspect, provided is a method of model training, which includes: acquiring a training set, where the training set includes a training sample generated by any method according to the first aspect; and training, according to the training set, a character recognition model for recognition of a wheel-type meter reading.

In a third aspect, provided is a method of character recognition, which includes: acquiring an image of face of a wheel-type meter, and performing character segmentation on the image of face to acquire a to-be-recognized image corresponding to each character wheel of the wheel-type meter; and inputting the to-be-recognized image into a character recognition model trained by any method according to the second aspect to acquire a reading on the face of the wheel-type meter.

In a fourth aspect, provided is a device for generating a training sample, which includes: an acquiring module configured to acquire a character image and determine each character contained in the character image; and a labeling module configured to determine a weight value for said each character contained in the character image by utilizing a projection approach and label the character image according to the weight value of said each character contained in the character image to form a training sample.

Preferably, the acquiring module is further configured to: capture a face image of a wheel-type meter; acquire a character image corresponding to a preset character wheel of the wheel-type meter by performing character segmentation on the face image; and determine said each character contained in the character image based on a rotational position of the preset character wheel.

Preferably, the labeling module is further configured to: determine, by utilizing the projection approach, a total character region of the character image and a partial character region corresponding to said each character in the total character region; and determine a projected ratio of the partial character region to the total character region, and determine the weight value for said each character contained in the character image based on the projected ratio.

Preferably, the labeling module is further configured to: update a preset weight sequence according to the weight value of said each character contained in the character image to acquire a target weight sequence, and label the character image according to the target weight sequence; where the preset weight sequence is pre-constructed by arranging preset weight values of a plurality of candidate characters in a preset arrangement order, and each of the plurality of candidate characters has a preset weight value of 0.

In a fifth aspect, provided is a device for model training, which includes: a training set acquiring module configured to acquire a training set, where the training set includes a training sample generated by any device according to the fourth aspect; and a model training module configured to train, according to the training set, a character recognition model for recognition of a wheel-type meter reading.

In a sixth aspect, provided is a device for character recognition, which includes: a to-be-recognized image acquiring module configured to acquire an image of face of a wheel-type meter, and perform character segmentation on the image of face to acquire a to-be-recognized image corresponding to each character wheel of the wheel-type meter; and a character recognizing module configured to input the to-be-recognized image into a character recognition model trained by any device according to the fifth aspect to acquire a reading on the face of the wheel-type meter.

In a seventh aspect, provided is a device for generating a training sample, which includes: one or more multicore processors; and a memory having one or more programs stored therein; where the one or more programs, when executed by the one or more multicore processors, cause the one or more multicore processors to implement operations of: acquiring a character image and determining each character contained in the character image; and determining a weight value for said each character contained in the character image by utilizing a projection approach, and labeling the character image according to the weight value of said each character contained in the character image to form a training sample.

In an eighth aspect, provided is a computer-readable storage medium having programs stored thereon, where the programs, when executed by a multicore processor, cause the multicore processor to implement any method according to the first aspect.

At least one of the technical solutions adopted in embodiments of the present disclosure can achieve the following beneficial effects. In embodiments of the present disclosure, the character image of the wheel-type meter is acquired firstly, and then projection-processed by utilizing a projection approach to acquire the weight value for said each character contained in the character image, after which the label of the character image is determined according to the weight value corresponding to each character, such that the generated training sample is not annotated with a single class label (such as "0", "1" or "2") but annotated with a bias-based label according to the weight value of each character contained in the character image, thereby enabling the training sample to better match the objective reality. Therefore, the character recognition model trained by the aforesaid training samples could not only have a good recognition effect for character images of the single full-character type, but also achieve accurate recognition for character images of the dual partial-character type. In addition, for the character images of the dual partial-character type, a bias-based recognition result with a rather high recognition accuracy can be achieved.

It should be understood that the aforesaid description only shows a summary of the technical solutions of the present disclosure to facilitate better understanding of technical means of the present disclosure for implementing the present disclosure in accordance with the content described in the specification. Specific embodiments of the present disclosure will be given below to make the above and other objects, features, and advantages of the present disclosure more apparent.

BRIEF DESCRIPTION OF THE DRAWINGS

By reading following details of the exemplary embodiments below, those of ordinary skills in the art may understand the advantages and benefits described herein and other advantages and benefits. The accompanying drawings are for the purpose of illustrating exemplary embodiments only and are not intended to be a limitation of the present disclosure. Further, a same reference sign is adopted to indicate a same component throughout the accompanying drawings. In the accompanying drawings.

In the accompanying drawings, the same or corresponding reference signs indicate same or corresponding portions.

DETAILED DESCRIPTION

Exemplary embodiments of the present disclosure will be described below in more detail with reference to the accompanying drawings. Although the accompanying drawings illustrate exemplary embodiments of the present disclosure, it should be understood that the present disclosure can be implemented in various forms and should not be construed as limited to embodiments described herein. Rather, these embodiments are provided so that the present disclosure will be understood thoroughly, and will fully convey the scope of the present disclosure to those skilled in the art.

In the present disclosure, it should be understood that terms such as "include" or "have" are intended to indicate the existence of the characteristics, figures, steps, actions, components, parts disclosed by the specification or a combination thereof, without excluding the existence of one or more other characteristics, figures, steps, actions, components, parts or a combination thereof.

Some terms in this context will be briefly introduced below.

A wheel-type meter refers to a meter device that drives one or more character wheels to rotate, such that the digits printed around the wheels are displayed separately in the reading frame of the face for the user to read the values, such as water meters, gas meters or others that are common in daily life.

It could be understood that the method of generating a training sample according to the present disclosure may be applied to any processing device having graphics processing capability. Particularly, the processing device may be a terminal, a server, or other device, including a central processing unit (CPU) and/or a graphics processing unit (GPU). The terminal may include a desktop terminal, a mobile smart terminal such as a mobile phone/tablet, a vehicle terminal, a wearable terminal, and the like.

Furthermore, it should be noted that, in the case of no conflict, the embodiments of the present disclosure and features of the embodiments may be combined with each other in any manner. The present disclosure will be described in detail below with reference to the accompanying drawings and embodiments.

Figure 1:
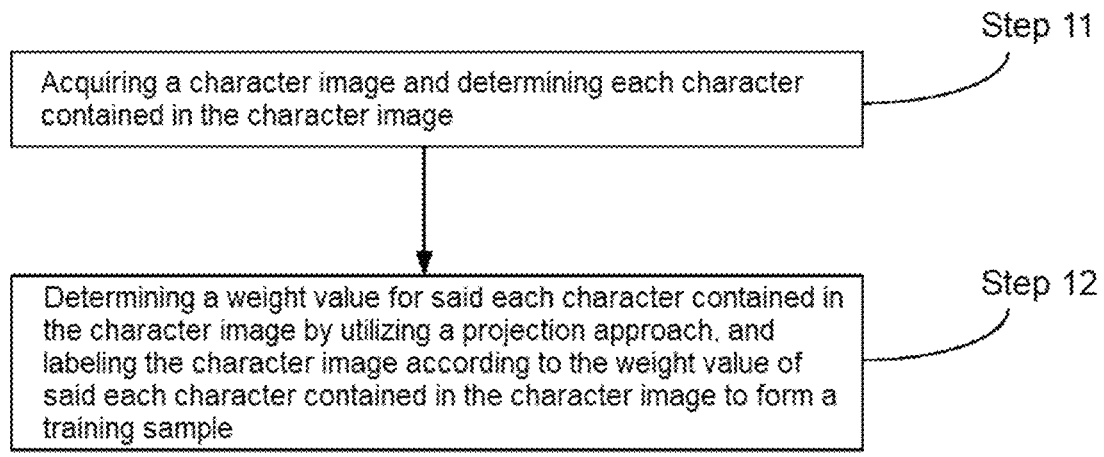
FIG. 1 is a schematic flowchart of a method of generating a training sample according to an embodiment of the present disclosure.

FIG. 1 is a schematic flowchart of a method of generating a training sample 10 according to an embodiment of the present disclosure. The method of generating a training sample 10 may be employed to generate a training sample for training a character recognition model which may be configured to recognize a reading on a face of wheel-type meter. In this process, the execution subject in terms of device may be one or more electronic devices; and the execution subject in terms of program may accordingly be one or more programs installed on the one or more electronic devices.

The process in FIG. 1 may include following steps 11 and 12.

Step 11: a character image is acquired and each character contained in the character image is determined.

Particularly, the character image may be a partial image corresponding to a certain character wheel in the face image of the wheel-type meter. The character image may be acquired by capturing the face image via a camera device mounted above the wheel-type meter and then segmenting the face image. Alternatively, the character image may also have other sources, such as from other devices, or may be a existing image, which is not limited in the present disclosure. Furthermore, the character image may include one or more of the candidate characters, and the candidate characters may include: "0", "1", "2", "3", "4", "5", "6", "7", "8", "9". Optionally, each character contained in the character image may be determined by pre-determining a character image acquisition strategy or by performing a preliminary template-matching on the character image, or by manual judgment.

For example, for any character wheel of a wheel-type meter, the character image displayed in the face image may include two types, i.e., respectively for a single full-character and a dual partial-character. The single full-character may include one selected from 0, 1, 2, 3, 4, 5, 6, 7, 8, and 9 for indicating the mere presence of a single character in the character image, and FIG. 2a for example shows the character image of the single full-character "1". The dual partial-character may include one selected from 0-1, 1-2, 2-3, 3-4, 4-5, 5-6, 6-7, 7-8, 8-9, and 9-0 for indicating the presence of two characters in the character image, and FIG. 2b for example shows the character image of the dual partial-character "0-1". This embodiment does not limit the number of characters contained in the character image. When other types of wheel-type meters are adopted, the character image may simultaneously have three or more characters.

Step 12: a weight value is determined for said each character contained in the character image by utilizing a projection approach, and the character image is labeled according to the weight value of said each character contained in the character image to form a training sample.

Particularly, the weight value of said each character contained in the character image may be configured to indicate the character distribution in the character image. The character corresponding to a higher weight value may be distributed in a higher proportion in the character image, and thus the actual reading of the wheel-type meter may show a greater bias towards the character with the higher weight value. Furthermore, in the wheel-type meter, a plurality of characters are usually may be evenly distributed on the surface of the character wheel, and the characters distributed on the surface of the character wheel may be displayed in turn in the character frame of the meter face by rotating the character wheel. Therefore, the distribution proportion of each character contained in the character image can be acquired easily and accurately by performing projection on the character image along a direction perpendicular to the character wheel, and thereby serve as the weight value.

Figure 2A:
FIG. 2*a* is a schematic diagram of a character image for a single full-character "1" according to an embodiment of the present disclosure.
Figure 2B:
FIG. 2*b* is a schematic diagram of a character image for a dual partial-character "0-1" according to an embodiment of the present disclosure.

For example, for the character image of the dual partial-character "0-1" as shown in FIG. 2b, the projection approach may be employed to determine the weight values of the respective characters "0" and "1" contained in the character image. It can be seen that, the character image shows an obvious bias towards the character "1" although it contains both characters "0" and "1". Under the traditional labeling method, the character image would be labeled as "0" or "1" or "0-1", neither of which could truly express the real character reading indicated by the character image. However, according to the present disclosure, the label with which the character image is annotated may carry the weight values of both character "0" and character "1", where the character "0" may be given a smaller weight value and the character "1" may be given a higher weight value, thereby enabling generation of a training sample more in line with the objective reality.

In this embodiment, the character image of the wheel-type meter is acquired firstly, and then projection-processed by utilizing a projection approach to acquire the weight value for each character contained in the character image, after which the label of the character image is determined according to the weight value corresponding to each character, such that the generated training sample is not annotated with a single class label (such as "0", "1" or "2") but annotated with a bias-based label according to the weight value of each character contained in the character image, thereby enabling the training sample to better match with the objective reality. Therefore, the character recognition model trained by the aforesaid training samples could not only have a good recognition effect for character images of the single full-character type, but also achieve accurate recognition for character images of the dual partial-character type. In addition, for the character images of the dual partial-character type, a bias-based recognition result with a rather high recognition accuracy can be achieved.

Based on the method of generating a training sample in FIG. 1, some embodiments of the present disclosure further provide some specific implementation solutions and extension solutions of the method, which will be described below.

In an embodiment, the step 11 may further include: capturing a face image of a wheel-type meter; acquiring a character image corresponding to a preset character wheel of the wheel-type meter by performing character segmentation on the face image; and determining said each character contained in the character image based on a rotational position of the preset character wheel.

Particularly, the wheel-type meter may include one or more character wheels, any one of which may be selected as the aforesaid preset character wheel. Furthermore, a preset character wheel of the wheel-type meter may be rotated according to a preset rotation rule, and a face image may be captured by a camera device mounted above the wheel-type meter. Then, the face image may be segmented by various segmentation algorithms, such as a global thresholding, an edge detection or a contour detection, to acquire a character image corresponding to the preset character wheel, such that the rotational position of the preset character wheel may be deduced based on the preset rotation rule and the capture time of the face image. Afterwards, the reading of the preset wheel currently presented in the face may be calculated from the rotational position of the preset wheel to determine each character contained in the character image. In this way, the tedious steps for determining the characters from the character images can be avoided, thereby further improving the efficiency of generating the training samples.

Optionally, since the weight values respectively corresponding to at least one character presented in the face is fixed when the rotational position of the preset character wheel is fixed, the weight value may also be determined for each character contained in the character image, directly from the rotational position of the preset character wheel.

In an embodiment, the step 12 of determining the weight value for said each character contained in the character image by utilizing the projection approach may further include: determining, by utilizing the projection approach, a total character region of the character image and a partial character region corresponding to said each character in the total character region; and determining a projected ratio of the partial character region to the total character region, and determining the weight value for said each character contained in the character image based on the projected ratio.

Figure 3A:
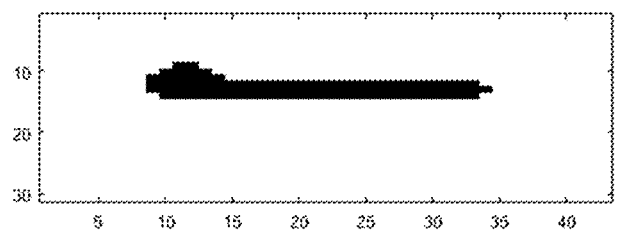
FIG. 3*a* is a binary image of FIG. 2*a*.
Figure 4A:
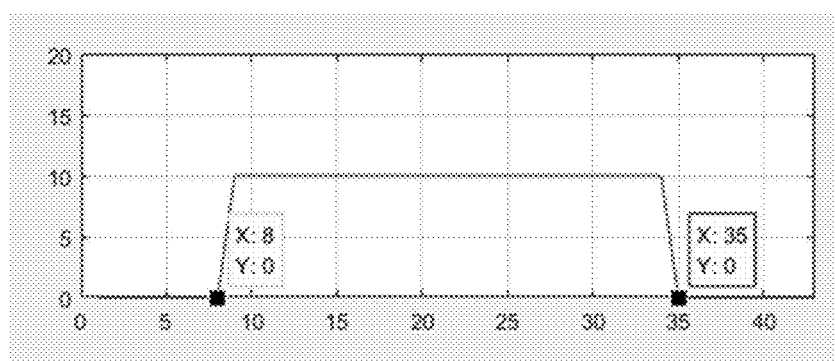
FIG. 4*a* is a projection histogram formed by performing projection on FIG. 3*a*.

Particularly, a binarization process may also be desired to be performed before performing projection on the character image. For example, FIG. 2a shows a character image of a single full-character "1", FIG. 3a shows a binary image of the single full-character "1", acquired by binarization performed on FIG. 2a, and FIG. 4a shows a projection histogram acquired by projection performed on FIG. 3a. From the projection histogram shown in FIG. 4a, it can be seen that the total character region of the character image corresponds to the X-coordinate interval "8 to 35", and the partial character region corresponding to character "1" corresponds to the X-coordinate interval "8 to 35". Therefore, the projected ratio of the partial character region of character "1" to the total character region is 100%, and thus the weight value of character "1" is 1 (100%).

Figure 3B:
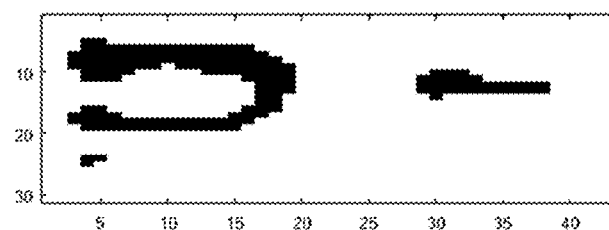
FIG. 3*b* is a binary image of FIG. 2*b*.
Figure 4B:
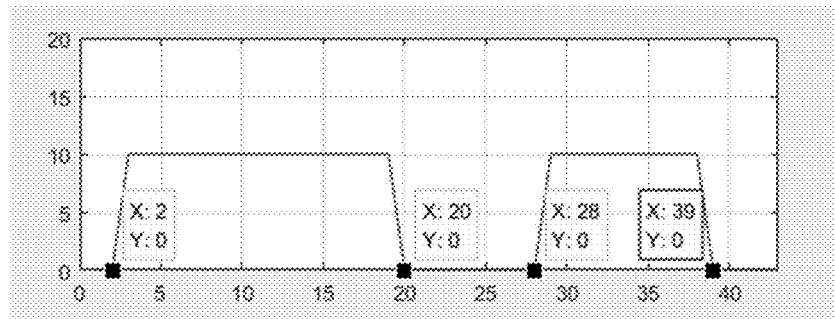
FIG. 4*b* is a projection histogram formed by performing projection on FIG. 3*b*.

For another example, FIG. 2b shows a character image of a dual partial-character "0-1", FIG. 3b shows a binary image of the dual partial-character "0-1", acquired by binarization performed on FIG. 2b, and FIG. 4 shows a projection histogram acquired by projection performed on FIG. 3b. From the projection histogram shown in FIG. 4b, it can be seen that the total character region of the character image corresponds to the X-coordinate intervals "2 to 20" and "28 to 39", the partial character region corresponding to the character "0" corresponds to the X-coordinate interval "2 to 20", and the partial character region corresponding to character "1" corresponds to the X-coordinate interval "28 to 39". Based on this, it can be calculated that the projected ratio of the partial character region of character "0" to the total character region is $(20-2+1)/[(20-2+1)+(39-28+1)]=0.6129$, and the weight value of character "0" is 61.29%. In addition, the projected ratio of the partial character region of character "1" to the total character region is $(39-28+1)/[(20-2+1)+(39-28+1)]=0.3871$, and the weight value of character "1" is 38.71%, such that the weight value sum of at least one character contained in the character image is 1. In this way, the weight value can be acquired more easily for each character contained in the character image.

In an embodiment, the step 12 of labeling the character image according to the weight value of said each character contained in the character image may further include: updating a preset weight sequence according to the weight value of said each character contained in the character image to acquire a target weight sequence, and labeling the character image according to the target weight sequence.

Particularly, the preset weight sequence herein may be pre-constructed by arranging preset weight values of a plurality of candidate characters in a preset arrangement order, and each of the plurality of candidate characters has a preset weight value of 0.

For example, the preset weight sequence may be $[R_0, R_1, R_2, R_3, R_4, R_5, R_6, R_7, R_8, R_9]$, and the plurality of candidate characters include 0, 1, 2, . . . , 9, where $R_0$ refers to the preset weight value corresponding to the candidate character "0", and $R_1$ refers to the preset weight value corresponding to the candidate character "1", and so on. Furthermore, since each candidate character of the plurality of candidate characters in this embodiment has a preset weight value of 0, the preset weight sequence may be $[0, 0, 0, 0, 0, 0, 0, 0, 0, 0]$. Furthermore, the preset weight sequence may be updated according to the weight value of each character contained in the character image to acquire the target weight sequence.

For example, FIG. 2a shows a character image of a single full-character "1". In a case that the preset weight sequence is updated according to the weight value of each character contained in the character image shown in FIG. 2a, the acquired target weight sequence may be [0, 1, 0, 0, 0, 0, 0, 0, 0, 0, 0] since the character image shown in FIG. 2a contains the character "1" and the weight value of the character "1" is 1 (100%).

For another example, FIG. 2b shows a character image of a dual partial-character "0-1". In a case that the preset weight sequence is updated according to the weight value of each character contained in the character image shown in FIG. 2b, the acquired target weight sequence may be [0.6129, 0.3871, 0, 0, 0, 0, 0, 0, 0, 0] since the character image shown in FIG. 2b contains the dual partial-character "0-1", and the character "0" has a weight value of 61.29% and character "1" has a weight value of 38.71%.

By pre-setting the arrangement order of the plurality of candidate characters, annotation can be done by directly taking the weight sequence as constructed in the arrangement order as a label without carrying specific character classes, such as "0" and "1", and labels in the aforesaid sequence format are more conducive to counting the sample coverage of a plurality of training samples in a training set.

Figure 5:
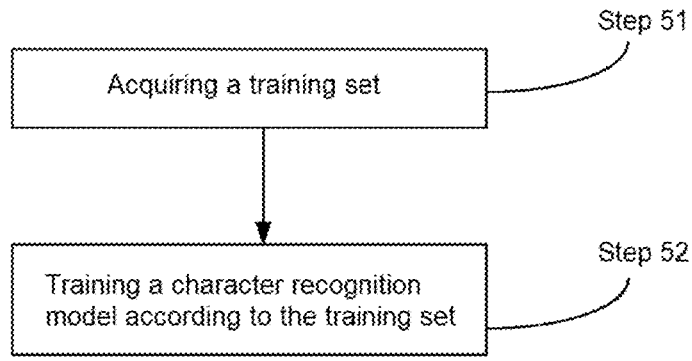
FIG. 5 is a schematic flowchart of a model training method according to an embodiment of the present disclosure.

Based on the method of generating a training sample, embodiments of the present disclosure further provide a model training method, and FIG. 5 is a schematic flowchart of a model training method 50 according to an embodiment of the present disclosure. As shown in FIG. 5, the method includes following steps.

Step 51: a training set is acquired.

The aforesaid training set includes a training sample as acquired according to the aforesaid method of generating a training sample.

Step 52: a character recognition model is trained based on the training set.

The character recognition model is configured to recognize a reading on the face of the wheel-type meter.

In this embodiment, the to-be-trained model is trained according to the existing method, such that the trained character recognition model can output at least one character and its corresponding weight value based on an inputted character image. The present disclosure does not limit the specific training method, and the to-be-trained model in this embodiment may be a deep learning model, a convolutional neural network model, and the like.

In this embodiment, the training sample for training the character recognition model is not annotated with a single class label, such as "0", "1" or "2", but annotated with a bias-based label according to the weight value of each character contained in the character image. Therefore, the trained character recognition model could not only have a good recognition effect for character images of single full-character type, but also achieve accurate recognition for character images of the dual partial-character type. In addition, for the character images of the dual partial-character type, a bias-based recognition result can be given, thereby enabling a character recognition model to be trained to have a high recognition accuracy.

Figure 6:
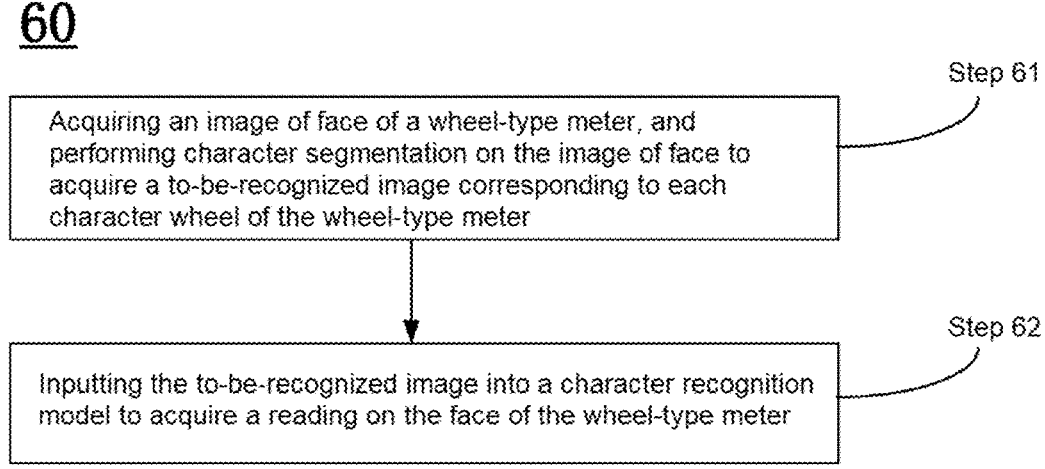
FIG. 6 is a schematic flowchart of a character recognition method according to an embodiment of the present disclosure.

Based on the model training method, embodiments of the present disclosure further provide a character recognition method, and FIG. 6 is a schematic flowchart of a character recognition method 60 according to an embodiment of the present disclosure. As shown in FIG. 6, the character recognition method includes following steps.

Step 61: an image of face of a wheel-type meter is acquired, and character segmentation is performed on the image of face to acquire a to-be-recognized image corresponding to each character wheel of the wheel-type meter.

Particularly, the image of face may be captured by a camera device mounted above the wheel-type meter.

Step 62: the to-be-recognized image is input into a character recognition model and acquiring a reading on the face of the wheel-type meter.

Particularly, the character recognition model may be trained by the model training method as shown in FIG. 5.

Figure 7:
FIG. 7 is a schematic diagram of an image of meter face according to an embodiment of the present disclosure.
Figure 8:
FIG. 8 is a schematic diagram of a to-be-recognized image according to an embodiment of the present disclosure.

For example, FIG. 7 is a schematic diagram of an image of face of a wheel-type meter, and FIG. 8 shows five to-be-recognized images "001.png", "002.png", "003.png", "004.png", and "005.png", which are acquired by performing binarization and character segmentation on FIG. 7. It should be understood that the five to-be-recognized images correspond to five character wheels of the wheel-type meter. Then, the five to-be-recognized images may be input into the trained character recognition model respectively, and thereby outputting following recognition results (assuming that the aforesaid [$R_0$, $R_1$, $R_2$, $R_3$, $R_4$, $R_5$, $R_6$, $R_7$, $R_8$, $R_9$] is adopted as the annotation label):

"001.png": [1, 0, 0, 0, 0, 0, 0, 0, 0, 0]
"002.png": [1, 0, 0, 0, 0, 0, 0, 0, 0, 0]
"003.png": [1, 0, 0, 0, 0, 0, 0, 0, 0, 0]
"004.png": [0, 0, 0, 1, 0, 0, 0, 0, 0, 0]
"005.png": [0, 0, 0, 0, 0, 0, 0.79, 0.21, 0, 0]

It can be seen that recognized characters as output by the character recognition model corresponding to "001.png", "002.png", "003.png", and "004.png" are "0", "0", "0" and "3", respectively, and each of the weight values corresponding to the recognized characters is 100%. Based on this, it can be determined that the first to the fourth characters are single full-characters 0, 0, 0 and 3. For the to-be-recognized image "005.png", the recognition result output by the character recognition model is [0, 0, 0, 0, 0, 0, 0, 0, 0.79, 0.21, 0, 0]. Based on this, it can be determined that the recognized characters are "6" and "7", where the character "6" has a higher weight value. Therefore, the to-be-recognized image "005.png" is identified as a dual partial-character "6-7" showing a bias towards 6.

In the character recognition method according to this embodiment, the character recognition model for performing character recognition can not only have a good recognition effect for character images of the single full-character type, but also can achieve accurate recognition for character images of the dual partial-character type. In addition, for the character images of the dual partial-character type, a bias-based recognition result can be given, thereby enabling a relatively high recognition accuracy.

Figure 9:
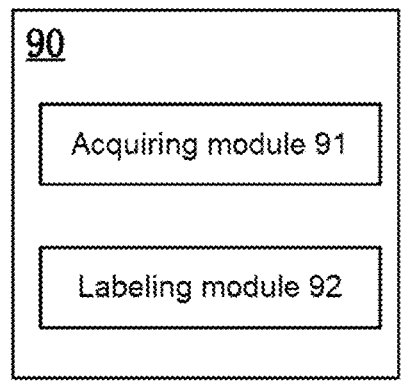
FIG. 9 is a schematic structural diagram of a device for generating a training sample according to an embodiment of the present disclosure.

Based on the method of generating a training sample, embodiments of the present disclosure further provide a training sample generation device, and FIG. 9 is a schematic structural diagram of a training sample generation device 90 according to an embodiment of the present disclosure. As shown in FIG. 9, the device includes:

an acquiring module 91 configured to acquire a character image and determine each character contained in the character image; and a labeling module 92 configured to determine a weight value for said each character contained in the character image by utilizing a projection approach, and label the character image according to the weight value of said each character contained in the character image to form a training sample.

In an embodiment, the acquiring module is further configured to: capture a face image of a wheel-type meter; acquire a character image corresponding to a preset character wheel of the wheel-type meter by performing character segmentation on the face image; and determine said each character contained in the character image by a rotational position of the preset character wheel.

In an embodiment, the labeling module is further configured to: determine, by utilizing the projection approach, a total character region of the character image and a partial character region corresponding to said each character in the total character region; and determine a projected ratio of the partial character region to the total character region, and determine the weight value for said each character contained in the character image based on the projected ratio.

In an embodiment, the labeling module is further configured to: update a preset weight sequence according to the weight value of said each character contained in the character image to acquire a target weight sequence, and label the character image according to the target weight sequence. The preset weight sequence is pre-constructed by arranging preset weight values of a plurality of candidate characters in a preset arrangement order, and each of the plurality of candidate characters has a preset weight value of 0.

In this embodiment, the character image of the wheel-type meter is acquired firstly, and then projection-processed by utilizing a projection approach to acquire the weight value for each character contained in the character image, after which the label of the character image is determined according to the weight value corresponding to each character, such that the generated training sample is not annotated with a single class label (such as "0", "1" or "2") but annotated with a bias-based label according to the weight value of each character contained in the character image, thereby enabling the training sample to better match the objective reality. Therefore, the character recognition model trained by the aforesaid training sample can not only have a good recognition effect for character images of the single full-character type, but also achieve accurate recognition for character images of the dual partial-character type. In addition, for the character images of the dual partial-character type, a bias-based recognition result with a rather high recognition accuracy can be achieved.

Figure 10:
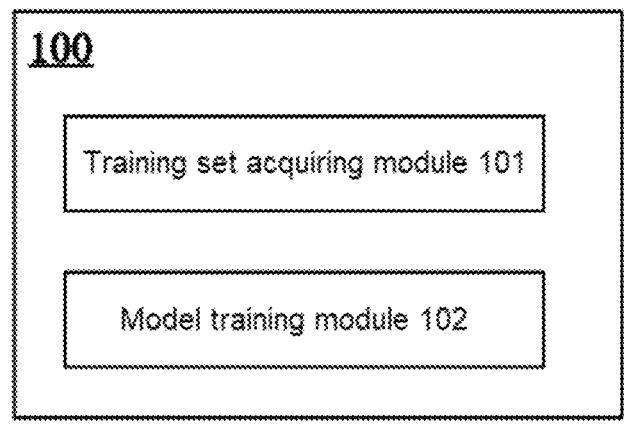
FIG. 10 is a schematic structural diagram of a model training device according to an embodiment of the present disclosure.

Based on the model training method, embodiments of the present disclosure further provide a model training device for a character recognition model for recognizing a reading on a face of a wheel-type meter, and FIG. 10 is a schematic structural flowchart of a model training device 100 according to an embodiment of the present disclosure. As shown in FIG. 10, the model training device includes:
- a training set acquiring module 101 configured to acquire a training set, the training set including training samples generated by the device according to the fourth aspect; and
- a model training module 102 configured to train, according to the training set, a character recognition model for recognition of a wheel-type meter reading.

In this embodiment, the training sample for training the character recognition model is not annotated with a single class label, such as "0", "1" or "2", but annotated with a bias-based label according to the weight value of each character contained in the character image. Therefore, the trained character recognition model can not only have a good recognition effect for character images of the single full-character type, but also achieve accurate recognition for character images of the dual partial-character type. In addition, for the character images of the dual partial-character type, a bias-based recognition result can be given, thereby enabling a character recognition model to be trained to have a high recognition accuracy.

Figure 11:
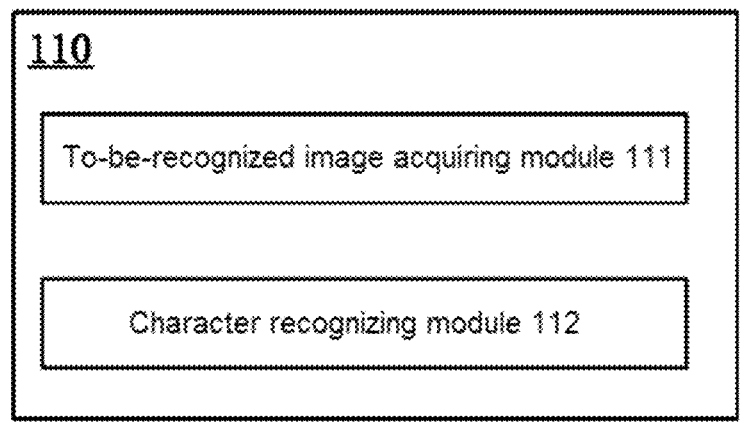
FIG. 11 is a schematic structural diagram of a character recognition device according to an embodiment of the present disclosure.

Based on the character recognition method, embodiments of the present disclosure further provide a character recognition device for recognizing a reading on a face of a wheel-type meter, and FIG. 11 is a schematic structural flowchart of a character recognition device 110 according to an embodiment of the present disclosure. As shown in FIG. 11, the character recognition device includes:
- a to-be-recognized image acquiring module 111 configured to acquire an image of face of a wheel-type meter, and perform character segmentation on the image of face to acquire a to-be-recognized image corresponding to each character wheel of the wheel-type meter; and
- a character recognizing module 112 configured to input the to-be-recognized image into a character recognition model trained by the device according to the fifth aspect, and thereby acquire a reading on the face of the wheel-type meter.

In the character recognition device according to this embodiment, the character recognition model for performing character recognition can not only have a good recognition effect for character images of the single full-character type, but also can achieve accurate recognition for character images of the dual partial-character type. In addition, for the character images of the dual partial-character type, a bias-based recognition result can be given, thereby enabling a relatively high recognition accuracy.

It should be noted that the training sample generation device, the model training device, and the character recognition device according to embodiments of the present disclosure may implement each process in embodiments of the aforesaid training sample generation method, the model training method, and the character recognition method, respectively, and can achieve the same effect and function, which will not be repeated here.

Figure 12:
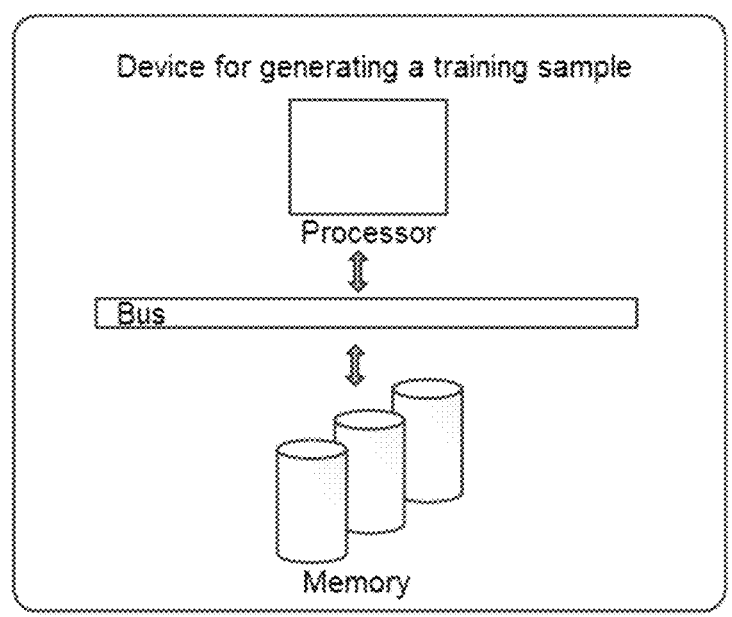
FIG. 12 is a schematic structural diagram of a device for generating a training sample according to another embodiment of the present disclosure.

FIG. 12 is a schematic diagram of a training sample generation device according to an embodiment of the present disclosure for performing the method of generating a training sample as shown in FIG. 1. The device includes:
- at least one processor; and
- a memory, communicatively connected with the at least one processor;
- where the memory have instructions executable by the at least one processor stored therein, such that the instructions, when executed by the at least one processor, cause the at least one processor to implement following operations of:
- acquiring a character image and determining each character contained in the character image; and
- determining a weight value for said each character contained in the character image by utilizing a projection approach, and labeling the character image according to the weight value of said each character contained in the character image to form a training sample.

According to some embodiments of the present disclosure, provided is a non-transitory computer storage medium for the method of generating a training sample, which have computer-executable instructions stored thereon. The computer-executable instructions are configured to, when executed by a processor, cause following operations to be implemented:
- acquiring a character image and determining each character contained in the character image; and
- determining a weight value for said each character contained in the character image by utilizing a projection approach, and labeling the character image according to the weight value of said each character contained in the character image to form a training sample.

The respective embodiments of the present disclosure are described in a progressive manner. The reference may be made to each other for the same or similar parts of the respective embodiments, and each embodiment focuses on the differences from other embodiments. Especially, for the embodiments of the device, apparatus and computer-readable storage medium, since they basically correspond to the embodiments of the method, they are described in a simple way, and reference may be made to the description part on embodiments of the method for relevant points.

The device, apparatus and computer-readable storage medium according to embodiments of the present disclosure correspond to the method one by one. Therefore, the apparatus and computer-readable storage medium have similar beneficial technical effects with the corresponding method. Since the beneficial technical effects of the method have been described in detail above, the beneficial technical effects of the apparatus and computer-readable storage medium will not be repeated here.

Those skilled in the art should understand that the embodiments of the present disclosure may be provided as a method, a system, or a computer program product. Therefore, the present disclosure may be in the form of full hardware embodiments, full software embodiments, or a combination thereof. Moreover, the present disclosure may be in the form of a computer program product that is implemented on one or more computer-usable storage medium (which includes, but is not limited to, magnetic disk storage, CD-ROM, optical storage) containing computer-usable program codes.

The present disclosure is described referring to the flowchart and/or block diagram of the method, device (system) and computer program product according to the embodiments of the present disclosure. It should be understood that, each flow and/or block in the flowchart and/or block diagram and the combination of flow and/or block in the flowchart and/or block diagram may be realized via computer program instructions. Such computer program instructions may be provided to the processor of a general-purpose computer, a special-purpose computer, a built-in processor or other programmable data processing devices to produce a machine, such that the instructions executed by the processor of a computer or other programmable data processing devices may produce a device for realizing the functions specified in one or more flows in the flowchart and/or one or more blocks in the block diagram.

Such computer program instructions may also be stored in a computer-readable storage that can guide a computer or other programmable data processing devices to work in a specific mode, such that the instructions stored in the computer-readable storage may produce a manufacture including a commander equipment, where the commander equipment may realize the functions specified in one or more flows of the flowchart and one or more blocks in the block diagram.

Such computer program instructions may also be loaded to a computer or other programmable data processing devices, such that a series of operational processes may be executed on the computer or other programmable devices to produce a computer-realized processing, and thereby the instructions executed on the computer or other programmable devices may provide a process for realizing the functions specified in one or more flows in the flowchart and/or one or more blocks in the block diagram.

In a typical configuration, the computing device includes one or more processors (CPU), an input/output interface, a network interface, and a memory.

The memory may include a non-permanent memory in a computer-readable medium, a random access memory (RAM) and/or a non-volatile memory, such as a read-only memory (ROM) or a flash memory (flash RAM). The memory is an example of a computer-readable medium.

The computer-readable medium may be permanent and non-permanent, or removable and non-removable media, which can achieve the information storage by any method or technology. The information may be computer-readable instructions, data structures, program modules, or other data. Examples of the computer storage medium include, but are not limited to, a phase change memory (PRAM), a static random access memory (SRAM), a dynamic random access memory (DRAM), other types of random access memory (RAM), read-only memory (ROM), an electrically erasable programmable read-only memory (EEPROM), a flash memory or other memory technologies, a CD-ROM, a digital versatile disc (DVD) or other optical storage, and a magnetic cassette tape. The magnetic tape storage or other magnetic storage devices or any other non-transmission medium may be used to store information that can be accessed by computing devices. Furthermore, although the operations of the method of the present disclosure are described in a specific order in drawings, it does not require or imply that the operations must be performed in the specific order, or that the desired result can only be achieved if all the operations as shown are performed. Additionally or alternatively, some steps may be omitted, multiple steps may be combined into one step for execution, and/or one step may be decomposed into multiple steps for execution.

Although the spirit and principles of the present disclosure have been described with reference to several embodiments, it shall be understood that the present disclosure is not limited to the embodiments as disclosed, nor does the division of the aspects imply that the features in those aspects cannot be combined for benefit, such division being for convenience of presentation only. The present disclosure is intended to cover various modifications and equivalent arrangements included within the spirit and scope of the appended claims.

What is claimed is:

1. A method of generating a training sample, the method comprising:
   capturing a face image of a wheel-type meter;
   acquiring a character image corresponding to each character position on the wheel-type meter by performing character segmentation on the face image, wherein the character image at one character position comprises partial views of two adjacent characters resulting from a transitional rotational position of a character wheel in the wheel-type meter;
   determining each character within the character image based on a rotational position of the character wheel;
   determining a weight value for each character within the character image by utilizing a projection approach, wherein the weight value of each character within the character image is determined by a projected ratio of a partial character region of each character relative to a total character region of the character image; and
   labeling the character image based on the weight value of each character within the character image to generate the training sample.

2. The method of claim 1, wherein determining the weight value for each character within the character image by utilizing the projection approach comprises:
   determining, by utilizing the projection approach, the total character region of the character image and the partial character region corresponding to each character in the total character region;

determining the projected ratio of the partial character region to the total character region; and determining the weight value for each character within the character image based on the projected ratio.

3. The method of claim 1, wherein labeling the character image based on the weight value of each character within the character image comprises:

updating a preset weight sequence according to the weight value of each character within the character image to acquire a target weight sequence; and labeling the character image based on the target weight sequence, wherein the preset weight sequence is pre-constructed by arranging preset weight values of a plurality of candidate characters in a preset arrangement order, and each of the plurality of candidate characters has a preset weight value of 0.

4. The method of claim 1, further comprising:

acquiring a training set, wherein the training set comprises the training sample; and training, based on the training set, a character recognition model for recognition of a wheel-type meter reading.

5. The method of claim 1, wherein, for the character image at the one character position that includes the partial views of two adjacent characters, determining the weight value for each character comprises:

determining a first weight value for a first partially visible character based on a projected ratio of a region corresponding to the first partially visible character relative to the total character region of the character image; and determining a second weight value for a second partially visible character based on a projected ratio of a region corresponding to the second partially visible character relative to the total character region of the character image.

6. The method of claim 4, further comprising:

acquiring an image of face of the wheel-type meter;

performing character segmentation on the image of face to acquire a to-be-recognized image corresponding to each character wheel of the wheel-type meter; and inputting the to-be-recognized image into the character recognition model to acquire a reading on the face of the wheel-type meter.

7. The method of claim 5, wherein labeling the character image based on the weight value of each character within the character image to form the training sample comprises:

constructing a weight sequence by assigning the first weight value and the second weight value to respective positions in a predefined sequence of candidate characters;

setting weight values for all other candidate characters in the weight sequence to zero; and using the weight sequence as a label for the character image corresponding to the character position.

8. A device for generating a training sample, the device comprising:

an acquiring module configured to capture a face image of a wheel-type meter, acquire a character image corresponding to each character position on the wheel-type meter by performing character segmentation on the face image, wherein the character image at one character position includes partial views of two adjacent characters resulting from a transitional rotational position of a character wheel in the wheel-type meter; and a labeling module configured to determine a weight value for each character within the character image by utilizing a projection approach and label the character image based on the weight value of each character within the character image to generate the training sample, wherein the weight value of each character within the character image is determined by a projected ratio of a partial character region of each character relative to a total character region of the character image.

9. The device of claim 8, wherein the labeling module is configured to:

determine, by utilizing the projection approach, the total character region of the character image and the partial character region corresponding to each character in the total character region;

determine the projected ratio of the partial character region to the total character region; and determine the weight value for each character within the character image based on the projected ratio.

10. The device of claim 8, wherein the labeling module is configured to:

update a preset weight sequence according to the weight value of each character within the character image to acquire a target weight sequence; and label the character image based on the target weight sequence, wherein the preset weight sequence is pre-constructed by arranging preset weight values of a plurality of candidate characters in a preset arrangement order, and each of the plurality of candidate characters has a preset weight value of 0.

11. The device of claim 8, further comprising:

a training set acquiring module configured to acquire a training set, wherein the training set comprises the training sample; and a model training module configured to train, based on the training set, a character recognition model for recognition of a wheel-type meter reading.

12. The device of claim 8, wherein for the character image at the character position that includes the partial views of two adjacent characters, the labeling module is further configured to:

determine a first weight value for a first partially visible character based on a projected ratio of a region corresponding to the first partially visible character relative to the total character region of the character image; and determine a second weight value for a second partially visible character based on a projected ratio of a region corresponding to the second partially visible character relative to the total character region of the character image.

13. The device of claim 11, further comprising:

a to-be-recognized image acquiring module configured to acquire an image of face of the wheel-type meter and perform character segmentation on the image of face to acquire a to-be-recognized image corresponding to each character wheel of the wheel-type meter; and a character recognizing module configured to input the to-be-recognized image into the character recognition model to acquire a reading on the face of the wheel-type meter.

14. The device of claim 12, wherein the labeling module is further configured to:

construct a weight sequence by assigning the first weight value and the second weight value to respective positions in a predefined sequence of candidate characters;

set weight values for all other candidate characters in the weight sequence to zero; and use the weight sequence as a label for the character image corresponding to the character position.

15. A non-transitory computer-readable storage medium having programs stored thereon, wherein the programs, when executed by one or more multicore processors, cause the one or more multicore processors to implement a method for generating a training sample, the method comprising:
- capturing a face image of a wheel-type meter;
- acquiring a character image corresponding to each character position on the wheel-type meter by performing character segmentation on the face image, wherein the character image at one character position includes partial views of two adjacent characters resulting from a transitional rotational position of a character wheel in the wheel-type meter;
- determining each character within the character image based on a rotational position of the character wheel;
- determining a weight value for each character within the character image by utilizing a projection approach, wherein the weight value of each character within the character image is determined by a projected ratio of a partial character region of each character relative to a total character region of the character image; and
- labeling the character image based on the weight value of each character within the character image to generate the training sample.

16. The non-transitory computer-readable storage medium of claim 15, wherein, for the character image at the one character position that includes the partial views of two adjacent characters, determining the weight value for each character comprises:
- determining a first weight value for a first partially visible character based on a projected ratio of a region corresponding to the first partially visible character relative to the total character region of the character image; and
- determining a second weight value for a second partially visible character based on a projected ratio of a region corresponding to the second partially visible character relative to the total character region of the character image.

17. The non-transitory computer-readable storage medium of claim 16, wherein labeling the character image based on the weight value of each character within the character image to form the training sample comprises:
- constructing a weight sequence by assigning the first weight value and the second weight value to respective positions in a predefined sequence of candidate characters;
- setting weight values for all other candidate characters in the weight sequence to zero; and
- using the weight sequence as a label for the character image corresponding to the character position.

* * * * *